United States Patent [19]
Hiruma

[11] 3,963,261
[45] June 15, 1976

[54] VEHICLE SUSPENSION SYSTEM
[75] Inventor: Mituo Hiruma, Kodaira, Japan
[73] Assignee: Nissan Motor Co., Ltd., Yokohama, Japan
[22] Filed: Mar. 3, 1975
[21] Appl. No.: 554,493

[30] Foreign Application Priority Data
  Mar. 4, 1974   Japan.......................... 49-24581[U]

[52] U.S. Cl................................ 280/683; 280/6 H; 267/65 D
[51] Int. Cl.²........................................ B60G 17/00
[58] Field of Search.......... 280/124 F, 6 H, DIG. 1; 267/65 D; 137/596

[56] References Cited
UNITED STATES PATENTS

| | | | |
|---|---|---|---|
| 3,620,542 | 11/1971 | Hovorka......................... | 280/124 F |
| 3,690,688 | 9/1972 | Fleury............................ | 280/124 F |
| 3,784,228 | 1/1974 | Hoffmann...................... | 280/124 F |

*Primary Examiner*—Philip Goodman

[57] ABSTRACT

A control valve is disposed between automatic level control means of hydropneumatic shock absorbers and a pressurized hydraulic fluid source to normally provide fluid communication therebetween. The control valve blocks fluid communication therebetween in response to a difference between the relative displacement or distance between a sprung part of the vehicle and a first unsprung part thereof and the relative displacement or distance between the sprung part and a second unsprung part of the vehicle.

8 Claims, 3 Drawing Figures

VEHICLE SUSPENSION SYSTEM

The present invention relates generally to a hydropneumatic suspension system in a vehicle and particularly to such a hydropneumatic suspension system in which the respective automatic level control means of the hydropneumatic suspension struts are rendered ineffective when a vehicle body is inclined in a transverse direction.

A hydropenumatic suspension system comprises automatic level control means which is effective to provide fluid communication between a fluid chamber of a suspension strut and a pressurized hydraulic fluid source to cause supply of pressurized hydraulic fluid into the fluid chamber for lengthening of the suspension strut in response to shortening of the suspension strut due to an increase in a load applied thereto and between the fluid chamber and a hydraulic fluid reservoir to cause discharge of hydraulic fluid from the fluid chamber for shortening of the suspension strut in response to lengthening of the suspension strut due to a reduction in the load to maintain the length of the suspension strut substantially constant independently of the value of the load.

Accordingly, when a wheel of the vehicle remains on a bump to cause transverse inclination of the vehicle body during parking on an uneven ground, a suspension strut cooperating with the wheel is shortened to cause lengthening of the suspension unit so that the transverse inclination of the vehicle body is inconveniently increased. Moreover, the suspension system may eliminate transverse inclination of the vehicle body caused by a centrifugal force acting on the vehicle during curvilinear travel. As a result, when the vehicle is shifted from the curvilinear travel to rectilinear travel, the vehicle body is caused to undesirably incline in an opposite transverse direction. Such a inclination of the vehicle body causes deterioration of riding quality. Moreover, when the vehicle is shifted from a ride on a curved road to a ride on an oppositely curved road, the vehicle body is caused to excessively incline in a direction of a centrifugal force acting on the vehicle. This deteriorates the riding stability to the extent that the vehicle may overturn.

It is, therefore, an object of the invention to provide a hydropneumatic suspension system which comprises means for rendering automatic level control means ineffective when a vehicle body is inclined in a transverse direction in excess of a predetermined limit.

This and other objects and advantages of the invention will become more apparent from the following detailed description taken in connection with the accompanying drawings in which.

Figure 1:
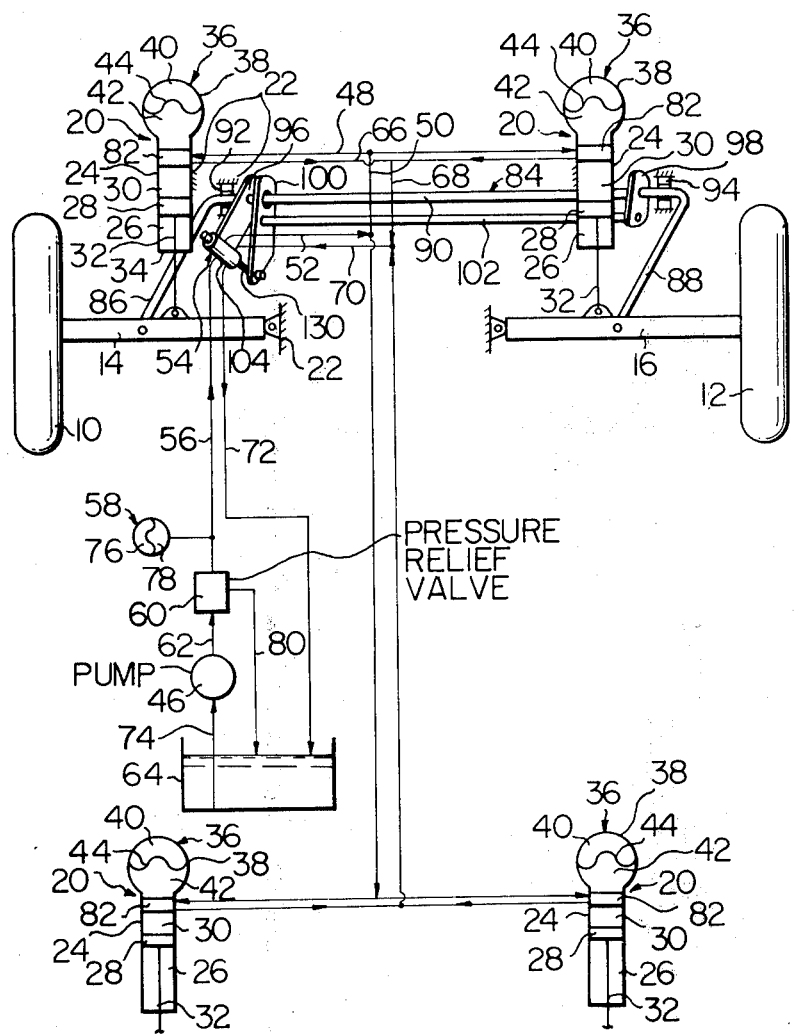
FIG. 1 is a schematic view of a first preferred embodiment of a hydropneumatic suspension system according to the invention.

Referring to FIG. 1, there are shown front left and right wheels 10 and 12 of a vehicle, axles 14 and 16 through which the wheels 10 and 12 support the front portion of the vehicle body 18, and a hydropneumatic suspension system according to the invention. The hydropneumatic suspension system is shown to comprise first and second retractable or compressible and extensible hydropneumatic suspension units and struts 20 which are operatively mounted respectively between the axle 14 and the vehicle body 18 and between the axle 16 and the vehicle body 18, and similar third and fourth retractable or compressible and extensible hydropneumatic suspension units or struts 20 which are operatively mounted respectively between the vehicle body 18 and left and right rear axles (not shown) through which the left and right rear wheels (not shown) support the rear portion of the vehicle body 18. Each of the wheels and axles constitutes an unsprung part of the vehicle and the vehicle body 18 constitutes the sprung part of the vehicle, as well known.

Each hydropneumatic suspension unit 20 comprises a cylinder 24 which is mounted on the vehicle body 18 in a suitable manner and which is formed therein with a cylinder bore 26. A piston 28 is axially slidably fitted in the cylinder bore 26 and defines therein a fluid chamber 30 which is filled with pressurized hydraulic fluid therein. The volume of the cylinder chamber 30 is variable in response to increases and decreases in the load applied to the corresponding suspension unit 20 or the operation of the vehicle over an uneven road to cause shortening and lengthening of the suspension unit 20. A piston rod 32 extends from the piston 28 outwardly through an end 34 of the cylinder 24 and is mounted on the corresponding axle in a suitable manner. Alternatively, the cylinder 24 may be mounted on the corresponding axle, while the piston rod 32 may be mounted on the vehicle body 18 in a suitable manner.

Each suspension unit 20 is provided with hydropneumatic spring means or an accumulator 36 which has a casing 38 divided into a gas chamber 40 and a fluid chamber 42 by a flexible partition member or diaphragm 44. The gas chamber 40 is filled with gas under pressure, while the fluid chamber 42 is filled with presurized hydraulic fluid and communicates with the cylinder chamber 30. The accumulator 36 serves to damp or absorb changes in the volume of or pressure in the corresponding cylinder chamber 30 due to momentary relative movements between the corresponding cylinder and piston 24 and 28 caused by bumps in the road surface over which the vehicle travels.

Each of the cylinder chambers 30 communicates with a pressurized hydraulic fluid source such as a pump 46 by way of fluid supply line which includes conduits 48, 50 and 52, a control valve 54, a conduit 56, an accumulator 58, an unloading pressure control valve or pressure relief valve 60 and a conduit 62. Each cylinder chamber 30 also communicates with a hydraulic fluid reservoir 64 by way of a fluid return line which includes conduits 66, 68 and 70, the control valve 54 and a conduit 72. The pump 46 draws hydraulic fluid from the reservoir 64 by way of a conduit 74 and pumps pressurized hydraulic fluid into the fluid supply line. The pump 46 may be driven by the engine (not shown) of the vehicle or any other suitable drive means such as an electric motor. The accumulator 58 has a gas chamber 76 filled with gas under pressure and a fluid chamber 78 filled with pressurized hydraulic fluid and communicating with the conduit 56 and serves to store energy of pressurized hydraulic fluid from the pump 46. The pressure relief valve 60 serves to return hydraulic fluid from the pump 46 to the reservoir 64 by way of a conduit 80 whenever the pressure of hydraulic fluid in the fluid supply line exceeds a predetermined level and to cease return of hydraulic fluid to the reservoir 64 whenever the pressure of hydraulic fluid in the fluid supply line drops below the predetermined level. The control valve 54 is normally open to provide fluid communication between the conduits 52 and 56 and between the conduits 70 and 72 and is closed to block fluid communication between the conduits 52 and 56 and between the conduits 70 and 72 when the vehicle body 18 is inclined in a transverse direction, as will be described in detail hereinafter.

Each suspension unit 20 is provided therein with automatic level regulating valve means 82 which is operable to normally block fluid communication between the cylinder chamber 30 and the conduit 48 and accordingly the pump 46 and between the cylinder chamber 30 and the conduit 66 and accordingly the reservoir 64 and to provide fluid communication between the conduit 48 and the cylinder chamber 30 to cause feed of pressurized hydraulic fluid thereinto for lengthening of the suspension unit 20 in response to shortening of the suspension unit 20 due to an increase in the load applied thereto and between the conduit 66 and the cylinder chamber 30 to cause discharge of hydraulic fluid therefrom for shortening of the suspension unit 20 in response to lengthening of the suspension unit 20 due to a reduction in the load applied thereto so that the height of the vehicle body 18 is maintained substantially constant independently of the value of the load applied thereto.

An anti-roll bar 84 is provided which lies in a generally horizontal plane and has first and second longitudinal members 86 and 88 each extending longitudinally of the vehicle and operatively connected respectively to the axles 14 and 16 and a transverse member 90 extending transversely of the vehicle and twistably received at locations adjacent to its ends in bearings 92 and 94 mounted on the vehicle body 18 and fixedly connected at its ends to the longitudinal members 86 and 88. When the front left or right wheel and axle assembly or structure is moved up and down, the transverse member 90 is twisted by the corresponding longitudinal members 86 or 88 to exert resistance to up and down movements of the wheel and axle assembly.

First and second arms 96 and 98 are fixedly secured to the anti-roll bar 84 at opposite locations adjacent to the bearings 92 and 94 so that the arm 96 or 98 is rotated by the transverse member 90 when this transverse member 90 is twisted. The arm 96 is longer than the arm 98 as shown in FIG. 1 and supports at its free end the control valve 54. A third arm 100 is pivotably mounted on the transverse member 90 at a location between the arms 96 and 98 and adjacent to the arm 96 and is operatively connected at its free end to the control valve 54. A connecting torsion bar 102 extends parallel to the transverse member 90 and is fixedly secured at its ends to the arms 98 and 100. The anti-roll bar 84 serves to sense the relative displacement or distance between the axle 14 or 16 and the vehicle body 18 to rotate the arm 96 or 98. The connection torsion bar 102 serves to sense rotation of the arm 98 with the longitudinal member 88 to rotate the arm 100 about the transverse member 90 to cause operation of the control valve 54.

Figure 2:
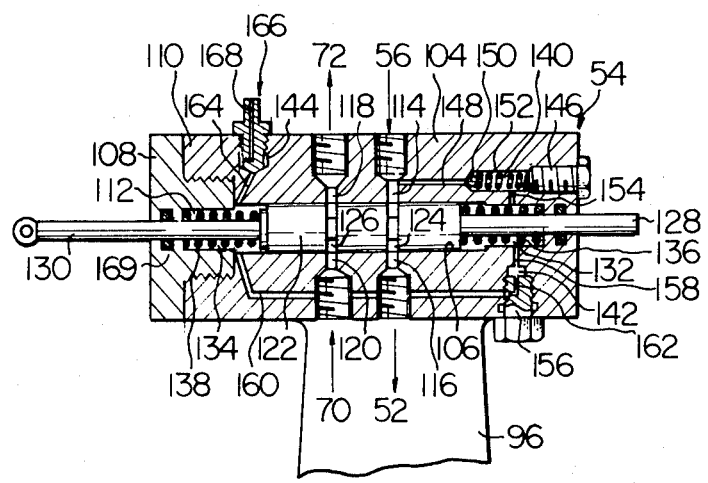
FIG. 2 is a schematic longitudinal cross sectional view of an example of a control valve forming a part of the hydropneumatic suspension system shown in FIG. 1.

Referring to FIG. 2, the control valve 54 is shown to comprise a valve body or housing 104 which is formed therein with a first bore 106 and which is fixedly secured to the free end of the first arm 96. An end plug or cap 108 is threaded in an end 110 of the valve body 104 and is formed therein with a bore 112 which is in alignment with the bore 106. The valve body 104 is also formed therein with first and second ports 114 and 116 which open into the bore 106 and which are in alignment with each other and third and fourth ports 118 and 120 which open into the bore 106 and which are in alignment with each other. The ports 114 and 116 are connected respectively to the conduits 56 and 52, while the ports 118 and 120 are connected respectively to the conduits 72 and 70.

A valve spool 122 is axially slidably fitted in the bore 106 and is formed therein with first and second annular grooves 124 and 126. The first annular groove 124 provides fluid communication between the first and second ports 114 and 116 and the second annular groove 126 provides fluid communication between the third and fourth ports 118 and 120, when the valve spool 122 is held in a neutral position shown in FIG. 2. A first rod 128 extends from one end of the valve spool 122 outwardly of the valve body 104. A second rod 130 extends from the other end of the valve spool 122 outwardly of the end plug 108 and is pivotably connected to the free end of the third arm 100. The anti-roll bar 84, the arms 96, 98 and 100, the connecting bar 102 and the second rod 130 serve as sensing means for sensing a difference between the relative displacement or distance between the axle 14 and the vehicle body 18 and the relative displacement or distance between the axle 16 and the vehicle body 18 which is in excess of a predetermined value to move the valve spool 122 to a position to obstruct fluid communication between the ports 114 and 116 and between the ports 118 and 120. A first fluid chamber 132 is defined in the bore 106 by one end of the valve spool 122 and the first rod 128 and a second fluid chamber 134 is defined in the bores 106 and 112 by the other end of the valve spool 122 and the second rod 130. The volumes of the chambers 132 and 134 are increased and reduced respectively and vice versa when the valve spool 122 is moved relative of the valve body 104. Two compression springs 136 and 138 are disposed respectively in the fluid chambers 132 and 134 to urge the valve spool 122 in opposite directions to hold it in the neutral position as shown in FIG. 2. The valve body 104 is further formed therein with second, third and fourth bores 140, 142 and 144. The second bore 140 is closed at one end by an end plug 146 and communicates at the other end with the first port 114 by way of a passage 148. A check valve 150 as disposed in the second bore 140 and is biased by a compression spring 152 to inhibit fluid flow from the bore 140 into the passsage 148 but to permit fluid flow from the passage 148 into the bore 140. The bore 140 communicates with the first fluid chamber 132 by way of a passage 154. The third bore 142 is closed by an end plug 156 and communicates with the first and second fluid chambers 132 and 134 by way of passages 158 and 160, respectively. The end plug 156 is formed therethrough with an orifice or restricted passage 162 which provides fluid communication between the passages 158 and 160. The orifice 162 limits hydraulic fluid flow from one of the first and second fluid chambers 132 and 134 to the other fluid chamber and vice versa through the passages 158 and 160 to constitute a dashpot to prevent hydraulic fluid in the first or second fluid chamber 132 or 134 from flowing too quickly to the second or first fluid chamber 134 or 132 by way of the passages 158 and 160 when the valve spool 122 is moved from the neutral position rightward or leftward in the drawing, thereby giving a resistance or delay to movement of the valve spool 122. The fourth bore 144 communicates with the second fluid chamber 134 by way of a passage 164. An air vent valve 166 is threaded in the fourth bore 144 and is formed therethrough with a passage 168 which is vented to the atmosphere and which opens into the bore 144. The air vent valve 166 is normally held in the position shown in FIG. 2 in which the inner end of the valve 166 closes the passage 164 to obstruct fluid communication between the passage 164 and the bore 144 and accordingly the passage 168 and is manually rotatable to move to a position in which the inner end of the valve 166 opens the passage 164 to provide fluid communication between the passages 164 and 168. Seal members 169 provide a fluid tight seal. The passage 148, check valve 150, second bore 140, passage 154, first fluid chamber 132, passage 158, third bore 142, orifice 162, passage 160, second fluid chamber 134 and passage 164 are filled with hydraulic fluid and constitute a one-way damper or delay fluid circuit which serves to exert a time lag to movement of the valve spool 122. In the use of the control valve 54, when pressurized hydraulic fluid is supplied into the first port 114, the air vent valve 166 is rotated to open the passage 164 to provide fluid communication between the passages 164 and 168 so that the pressurized hydraulic fluid is supplied into and fills up the one-way damper fluid circuit and concurrently air is removed or vented from the damper fluid circuit to the atmosphere by way of the passage 168 of the air vent valve 166. After completion of removal of air from the damper fluid circuit, the air vent valve 166 is rotated to close the passage 164 to obstruct fluid communication between the passages 164 and 168. If a part of the hydraulic fluid in the damper fluid circuit has escaped during the use of the control valve 54, the check valve 150 is opened so that pressurized hydraulic fluid is supplied to replenish the damper fluid circuit. Thus, the damper fluid circuit serves satisfactorily at all times during the use of the control valve 54.

The hydropneumatic suspension system thus far described is operated as follows:

When the vehicle travels on a rectilinear road or is parked on an even ground, the difference between the relative displacement or distance between the axle 14 and the vehicle body 18 and the relative displacement or distance between the axle 16 and the vehicle body 18 is substantially zero. As a result, the anti-roll bar 84 is not twisted. Consequently, the control valve 54 is held in the neutral position shown in FIG. 2 to provide fluid communication between the conduits 52 and 56 and accordingly the pump 46 and the respective level regulating valve means 82 and between the conduits 70 and 72 and accordingly the reservoir 64 and the respective level regulating valve means 82. Thus, the respective level control means 82 are effective and can provide fluid communication between the corresponding cylinder chambers 30 and the pump 46 and between the corresponding cylinder chambers 30 and the reservoir 64.

When the vehicle travels on a curvilinear road or the vehicle is parked on an uneven ground and a wheel of the vehicle is going over bumps of the ground, the vehicle body 18 is caused to incline in a transverse direction so that the anti-roll bar 84 is twisted to cause rotation of the first arm 96 or the second arm 98 and accordingly the third arm 100. In this instance, when the difference between the relative displacement or distance between the axle 14 and the vehicle body 18 and the relative displacement or distance between the axle 16 and the vehicle body 18 exceeds a predetermined value, the valve spool 122 of the control valve 54 is moved relative to the valve body 104 from the neutral position shown in FIG. 2 to a position to obstruct or block fluid communications between the conduits 52 and 56 and between the conduits 70 and 72. As a result, the respective level control valve means 82 are rendered ineffective to provide fluid communications between the corresponding cylinder chambers 30 and the pump 46 and between the corresponding cylinder chambers 30 and the reservoir 64. Thus, when the vehicle is shifted from the curvilinear travel to a travel on a rectilinear road or on an oppositely curved road, the vehicle body 18 is prevented from being undesirably or excessively inclined in an opposite transverse direction. Moreover, transverse inclination of the vehicle body 18 is prevented from being inconveniently promoted when the wheel remains on the bump during parking on the uneven ground.

When the anti-roll bar 84 is twisted due to momentary rolling movement of the vehicle body 18 which is caused by running of the vehicle over a rough road surface, although the anti-roll bar 84 is twisted the valve spool 122 of the control valve 54 is prevented from being moved from the neutral position shown in FIG. 2 to a position to obstruct fluid communications between the conduits 52 and 56 and between the conduits 70 and 72, by the dashpot in the third bore 142 which prevents hydraulic fluid in the first or second fluid chamber 132 or 134 from too quickly flowing into the second or first fluid chamber 134 or 132. Thus, the respective level control valve means 82 are maintained effective during momentary rolling movement of the vehicle body 18.

Figure 3:
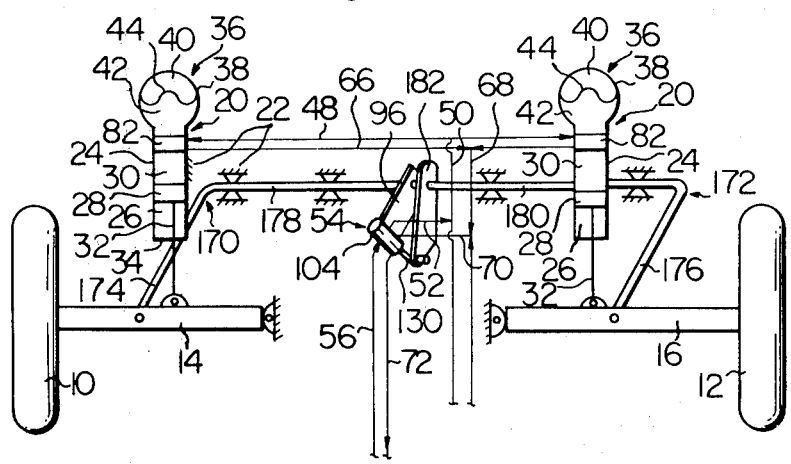
FIG. 3 is a schematic view of a second preferred embodiment of a hydropneumatic suspension system according to the invention.

FIG. 3 shows a second preferred embodiment of a hydropneumatic suspension system according to the invention. In the embodiment of FIG. 3, two torsion bars 170 and 172 are provided in place of the anti-roll bar 84 of the embodiment of FIG. 1. The torsion bars 170 and 172 lie in a generally horizontal plane and have respectively longitudinal members 174 and 176 each of which extends longitudinally of the vehicle and which are operatively connected respectively to the axles 14 and 16 of front left and right wheels 10 and 12 and transverse members 178 and 180 each of which extends transversely of the vehicle and toward a longitudinal axis thereof and is rotatably mounted on the vehicle body 18 and which are fixedly connected respectively to the longitudinal members 174 and 176. A first arm 96 similar to the first arm 96 of the embodiment of FIG. 1 is fixedly secured to an end of the transverse member 178. A control valve 54 similar to the control valve 54 of FIGS. 1 and 2 is supported by the first arm 96 similarly as described above with reference to and shown in FIGS. 1 and 2. A fourth arm 182 is fixedly secured to the end of the transverse member 180, which is opposite to the end of the transverse member 178, and is operatively connected to the control valve 54 similarly as described above with reference to and shown in FIGS. 1 and 2. As stated above and shown in FIG. 3, like component elements are designated by the same reference numerals as those used in FIG. 1.

In the arrangement of FIG. 3 thus far described, when the vehicle body 18 is inclined in a transverse direction, one of the first and second arms 96 and 182 is rotated relative to the other arm 96 or 182 by the corresponding torsion bar 170 or 172 to actuate the control valve 54. When the difference between the relative displacement or distance between the axle 14 and the vehicle body 18 and the relative displacement or distance between the axle 16 and the vehicle body 18 exceeds a predetermined value, the valve spool 122 of the control valve 54 is moved from the neutral position shown in FIG. 2 to a position to obstruct fluid communication between conduits 52 and 56 or between the respective automatic level control valve means 82 and a pump (not shown) and between conduits 70 and 72 or between the respective level control valve means 82 and a reservoir (not shown). Thus, the respective level regulating valve means 82 are rendered ineffective.

In the embodiment of FIG. 3, since the torsion bars 170 and 172 are employed in place of the anti-roll bar 84, it is necessary that the widths of annular grooves 124 and 126 of the valve spool 122 of the control valve 54 or the widths of first, second, third and fourth ports 114, 116, 118 and 120 of the valve body 104 of the control valve 54 are larger than the widths of the annular grooves 124 and 126 of the valve spool 122 of the control valve 54 of the embodiment of FIG. 1 or than the widths of the first, second, third and fourth ports 114, 116, 118 and 120 of the valve body 104 of the control valve 54 of the embodiment of FIG. 1 to increase the range of the displacement of the valve spool 122 which provides fluid communication between the ports 114 and 116 and between the ports 118 and 120.

It will be appreciated that a hydropneumatic suspension system according to the invention renders automatic level control valve means ineffective to obstruct fluid communication between the level control valve means and a pressurized hydraulic fluid source by sensing a difference or unbalance between the relative displacement or distance between the sprung part of the vehicle and a first unsprung part of the vehicle and the relative displacement or distance between the sprung part and a second unsprung part of the vehicle.

It will be appreciated that a hydropneumatic suspension system according to the invention can securely and accurately render automatic level control valve means ineffective as compared with a hydropneumatic suspension system of the type which renders automatic level control means ineffective by sensing a difference between the pressures of hydraulic fluids in the fluid chambers of two hydropneumatic suspension struts.

Although the invention has been described such that automatic level control valve means 82 are located within the corresponding hydropneumatic suspension struts 20, the invention can be applied to a hydropneumatic suspension system comprising automatic level control valve means which are disposed between the corresponding hydropneumatic suspension struts 20 and the control valve 54.

What is claimed is:

1. A suspension system in a vehicle, comprising first and second retractable and extensible suspension struts each of which has therein a fluid chamber filled with pressurized fluid, each of said fluid chambers being variable in volume in response to increases and decreases in a load applied to the corresponding suspension strut to cause shortening and lengthening of the suspension strut, each of said fluid chambers being fluidly communicable with a pressurized fluid source and a fluid reservoir, and level regulating means operable to normally obstruct fluid communication between the corresponding fluid chamber and said source and between said fluid chamber and said reservoir and to provide fluid communication between said source and said fluid chamber to cause supply of pressurized fluid thereinto for lengthening of the corresponding suspension strut in response to shortening thereof and between said reservoir and said fluid chamber to cause discharge of fluid therefrom for shortening of the suspension strut in response to lengthening thereof thereby maintaining the length of the suspension strut substantially constant independently of the value of said load, control means operable to normally provide fluid communication between the respective level regulating means and said source and to obstruct fluid communication therebetween in response to a difference between the relative distance between a sprung part of the vehicle and a first unsprung part thereof and the relative distance between said sprung part and a second unsprung part of the vehicle which difference is in excess of a predetermined value, and sensing means for sensing said difference to operate said control means to obstruct fluid communication between the respective level regulating means and said source, in which said control means is further operable to normally provide fluid communication between the respective level regulating means and said reservoir and to obstruct fluid communication therebetween when said sensing means senses said difference, in which said control means comprises a control valve having a valve body formed therein with a bore, a first port communicating with said source, a second port communicating with the respective level regulating means, a third port communicating with said reservoir, and a fourth port communicating with the respective level regulating means, a valve spool slidably fitted in said bore and formed therein with first and second annular grooves, and two biasing means urging said valve spool in opposite directions to hold it in a neutral position, said first and second grooves providing fluid communication between said first and second ports and between said third and fourth ports when said valve spool is held in said neutral position.

2. A suspension system as claimed in claim 1, in which said first and second suspension struts are operatively connected respectively to front left and right wheels of the vehicle.

3. A suspension system as claimed in claim 1, in which said first and second suspension struts are operatively connected respectively to rear left and right wheels of the vehicle.

4. A suspension system as claimed in claim 1, in which said sensing means comprises an anti-roll bar having first and second longitudinal members each extending longitudinally of the vehicle and connected respectively to said first and second unsprung parts and a transverse member extending transversely of the vehicle and rotatably mounted on said sprung part and fixedly connected at its ends to said longitudinal members, first and second arms fixedly secured to said transverse member at locations adjacent to said ends thereof, said first arm supporting said valve body of said control valve at its free end, a third arm pivotably mounted on said transverse member at a location adjacent to said first arm and operatively connected to said valve spool of said control valve, and a connecting bar extending parallel to said transverse member and fixedly secured at its ends to said second and third arms.

5. A suspension system as claimed in claim 1, in which said valve body has a first fluid chamber defined in said bore by one end of said valve spool, a second fluid chamber defined in said bore by the other end of said valve spool and a passage providing fluid communication between said first and second fluid chambers, each of said first and second fluid chambers being variable in volume when said valve spool is moved relative to said valve body, said first and second fluid chambers and said passage being filled with fluid therein, said passage being formed therein with a restriction which serves to limit fluid flow from one of said first and second fluid chambers to the other fluid chamber and vice versa through said passage to exert a resistance against movement of said valve spool when said valve spool is moved relative to the valve body by said sensing means.

6. A suspension system as claimed in claim 5, in which said control valve further comprises a check valve disposed between said first port and said first fluid chamber and serving to permit fluid flow from said first port to said first fluid chamber and to inhibit fluid flow from said first fluid chamber to said first port, and an air vent valve which is normally closed and which is opened to vent to the atmosphere air in said first and second fluid chambers and said passage when they are filled up by fluid.

7. A suspension system as claimed in claim 1, in which said sensing means comprises two torsion bars having first and second longitudinal members each extending longitudinally of the vehicle and connected to said first and second unsprung parts and first and second transverse members each extending transversely of the vehicle and toward a longitudinal axis of the vehicle and rotatably mounted on said sprung part and fixedly connected at their ends to said longitudinal members, and two arms which are fixedly secured to opposite ends of said transverse members and one of which supports said valve body and the other of which is operatively connected to said valve spool.

8. A suspension system for a vehicle, comprising first and second retractable and extensible suspension struts each of which has therein a fluid chamber filled with pressurized fluid and fluidly communicable with a pressurized fluid source and with a fluid reservoir, level regulating valve means interposed between said fluid chambers and on the one hand said source and on the other hand said reservoir and operable to normally obstruct fluid communication between said source and said fluid chambers and to provide said fluid communication to cause supply of pressurized fluid into said fluid chambers for lengthening of the corresponding suspension struts in response to shortening thereof due to increases in a load applied thereto and to normally obstruct fluid communication between said reservoir and said fluid chambers and to provide said fluid communication to cause discharge of fluid from said fluid chambers for shortening of the corresponding suspension struts in response to lengthening thereof due to decreases in said load applied thereto thereby maintaining the length of said corresponding suspension struts substantially constant independently of said load applied thereto, control valve means interposed between said level regulating valve means and on the one hand said source and on the other hand said reservoir and movable between a first position to provide fluid communication therebetween and a second position to obstruct said fluid communication, and sensing means operatively connected to said control valve means and responsive to a difference between the levels of first and second unsprung parts of a vehicle which difference exceeds a predetermined value to move said control valve means into said second position.

* * * * *